(12) United States Patent
Li et al.

(10) Patent No.: US 9,258,526 B2
(45) Date of Patent: Feb. 9, 2016

(54) METHOD AND SYSTEM FOR AUDIO/VIDEO COMMUNICATION, AND CLIENT THEREOF

(71) Applicant: TENCENT TECHNOLOGY (SHENZHEN) COMPANY LIMITED, Shenzhen, Guangdong (CN)

(72) Inventors: Zhongnan Li, Shenzhen (CN); Pu Wang, Shenzhen (CN); Xiaoyu Liu, Shenzhen (CN); Jiajun Chen, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 68 days.

(21) Appl. No.: 14/209,199

(22) Filed: Mar. 13, 2014

(65) Prior Publication Data

US 2014/0192139 A1 Jul. 10, 2014

Related U.S. Application Data

(63) Continuation of application No. PCT/CN2012/076989, filed on Jun. 15, 2012.

(30) Foreign Application Priority Data

Sep. 15, 2011 (CN) .......................... 2011 1 0273789

(51) Int. Cl.
*H04N 7/15* (2006.01)
*H04L 12/58* (2006.01)

(52) U.S. Cl.
CPC ............... *H04N 7/15* (2013.01); *H04L 51/10* (2013.01); *H04L 51/14* (2013.01)

(58) Field of Classification Search
CPC ........... H04N 7/15; H04N 7/152; H04N 7/14; H04N 7/141; H04N 7/147; H04L 51/14; H04L 51/10
USPC .................. 348/14.01–14.16; 715/753, 758
See application file for complete search history.

(56) References Cited

U.S. PATENT DOCUMENTS

2006/0031290 A1    2/2006   Mannaru et al.

FOREIGN PATENT DOCUMENTS

CN          1719810 A      1/2006
CN        101212751 A      7/2008
(Continued)

OTHER PUBLICATIONS

State Intellectual Property Office of the P. R. China (ISA/CN), "International Search Report", Sep. 27, 2012, China.
(Continued)

*Primary Examiner* — Melur Ramakrishnaiah
(74) *Attorney, Agent, or Firm* — Tim Tingkang Xia, Esq.; Locke Lord LLP

(57) ABSTRACT

The disclosure relates to a method and system for audio/video communication, and a client. The method includes setting up a connection with a server for audio/video communication, opening multiple windows for the audio/video communication; obtaining an enabling instruction for enabling audio/video communication of any one of the windows for audio/video communication amongst the multiple windows for audio/video communication; disabling audio/video communication for other windows for audio/video communication amongst the multiple windows for audio/video communication according to the enabling instruction. The method and system for audio/video communication obtain enabling instructions from the user for enabling any window for audio/video communication, and disable audio/video communication of the other windows for audio/video communication according to the enabling instruction, while the user would not have to close those unneeded windows for audio/video communication one by one, thereby improving the operation facility greatly, saving time and loosening the user's burden, and meeting the users' demands.

21 Claims, 2 Drawing Sheets

(56) References Cited

FOREIGN PATENT DOCUMENTS

| | | | |
|---|---|---|---|
| CN | 101600081 A | * | 12/2009 |
| CN | 102033776 A | * | 4/2011 |

OTHER PUBLICATIONS

State Intellectual Property Office of the P.R.C., "Office Action", Nov. 15, 2014, China.

* cited by examiner

METHOD AND SYSTEM FOR AUDIO/VIDEO COMMUNICATION, AND CLIENT THEREOF

CROSS-REFERENCE TO RELATED APPLICATIONS

The present application is a continuation application of International Application PCT/CN2012/076989, and claims priority from Chinese Patent Application 201110273789.4, filed Sep. 15, 2011, the content of which is incorporated herein in its entirety by reference.

FIELD OF THE INVENTION

The present disclosure relates generally to the field of network technology, and more particularly, to a method and system for audio/video communication, and client thereof.

BACKGROUND OF THE INVENTION

In the applications of instant communication, video communication is commonly used. As the prevailing application of the video communication, users are demanding more and more on video communications, and requiring higher for user experiences.

When users are conducting multiple video communications, it is required to open several multiple user audio/video communication windows (group window or chatting room window). For example, when using multiple user talking applications such as YY or QQTalk, multiple accounts are logged in for opening multiple chatting room windows. At this situation, because of the audio/video communications for the multiple audio/video communication windows are enabled, there would be interference therebetween. For avoiding the interference, user shall turn off the windows that would not need audio/video communications one by one, which required a lot of operation, and is inconvenient and adds the users' burden; user demands would thereby not be met.

Meanwhile, within the multiple user talking applications, as in a particular chatting room or group window, each user would be confronted with the same user objects for the video or audio communication, which would not meet the requirement that user could choose particular video or audio communication terminals.

SUMMARY OF THE INVENTION

Accordingly, it is necessary to provide a method, system and client for audio/video communication which could improve the operation convenience.

A method for audio/video communication includes:
a client setting up a connection with a server for audio/video communication, the client opening multiple windows for the audio/video communication;
obtaining an enabling instruction for enabling audio/video communication of any one of the windows for audio/video communication amongst the multiple windows for audio/video communication;
disabling audio/video communication for other windows for audio/video communication amongst the multiple windows for audio/video communication according to the enabling instruction.

A system for audio/video communication comprising a client and a server setting up audio/video communication connection with the client; the client opening multiple windows for audio/video communication, wherein the client includes:
an instruction obtaining module for obtaining an enabling instruction for enabling audio/video communication of any one of the windows for audio/video communication amongst the multiple windows for audio/video communication;
a control module for disabling audio/video communication for other windows for audio/video communication amongst the multiple windows for audio/video communication according to the enabling instruction.

A client for audio/video communication setting up audio/video communication connection with a server and opening multiple windows for audio/video communication, wherein the client includes:
an instruction obtaining module for obtaining an enabling instruction for enabling audio/video communication of any one of the windows for audio/video communication amongst the multiple windows for audio/video communication;
a control module for disabling audio/video communication for other windows for audio/video communication amongst the multiple windows for audio/video communication according to the enabling instruction.

The above method and system for audio/video communication obtain enabling instructions from the user for enabling any window for audio/video communication, and disable audio/video communication of the other windows for audio/video communication according to the enabling instruction, while the user would not have to close those unneeded windows for audio/video communication one by one, thereby improves the facility of operation greatly, saving time and loosen the user's burden, and meets the users' more and more demands.

DESCRIPTION OF THE PREFERRED EMBODIMENTS

Detailed description of the present disclosure would be described hereinafter with reference to accompanying figures.

Figure 1:
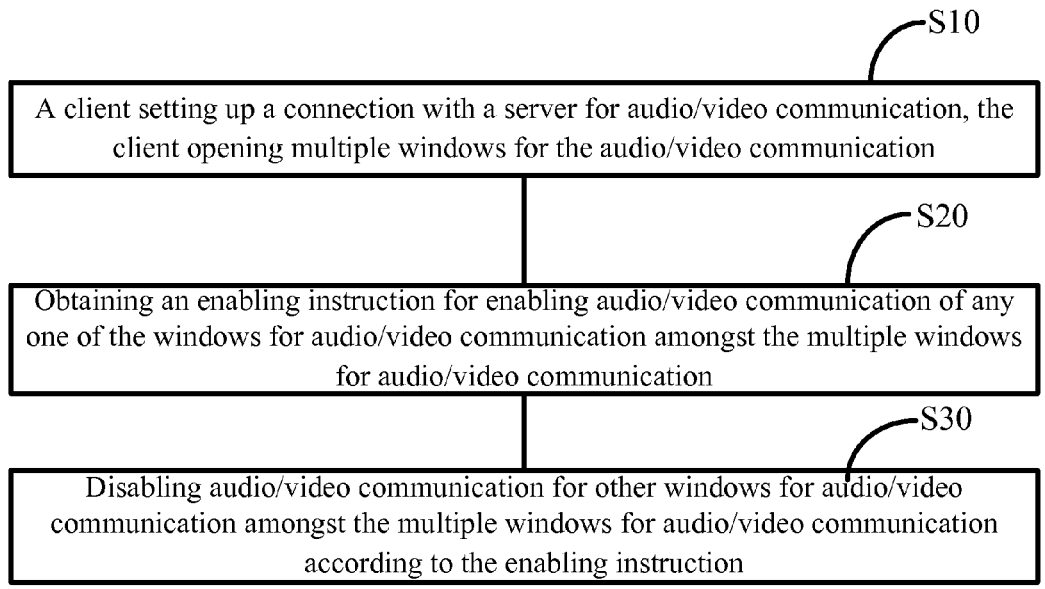
FIG. 1 is a flow diagram of a method for audio/video communication according to an embodiment.

FIG. 1 is a flow diagram in accordance with an exemplary embodiment of the method for audio/video communication. The method includes steps as follows.

S10, a client setting up a connection with a server for audio/video communication, the client opening multiple windows for the audio/video communication.

The audio/video communication is performed through a user opening windows for audio/video communication at a client, and setting up connection for audio/video communication through a server, thereby exchanging audio/video data. When conducting the audio/video communication, the users at the client may usually open multiple windows for the audio/video communication. The multiple windows for the audio/video communication could be windows for the audio/ video communication with another single user, or windows for the audio/video communication with multiple users (audio/video communication groups or audio/video communication chatting rooms). For instance, referring to FIG. 2, a user uses a QQ client for the instant messaging; the user simultaneously opens three windows for multiple users audio/video communication group or multiple users audio/video communication chatting room, respectively for QQ multiple users video communication A, for QQ multiple users video communication B, and for QQ multiple user video communication C.

S20, obtaining an enabling instruction for enabling audio/video communication of any one of the windows for audio/video communication amongst the multiple windows for audio/video communication.

According to an embodiment, audio/video communication icons are set in each window for audio/video communication for enabling the audio/video communication of the windows for audio/video communication. When enabling the audio/video communication for the window for audio/video communication, the user clicks the audio/video communication icon in the windows for audio/video communication, thereby generating an enabling instruction. In the current embodiment, the client obtains an enabling instruction for enabling audio/video communication of any one of the windows for audio/video communication amongst the multiple windows for audio/video communication.

S30, disabling audio/video communication for other windows for audio/video communication amongst the multiple windows for audio/video communication according to the enabling instruction.

When the user opens multiple windows for audio/video communication, there would be more than one window that conducting audio/video communication simultaneously, thereby they could be interference. For instance, referring to FIG. 2, the user opens three multiple users audio/video communication group or audio/video communication chatting room including the QQ multiple user video communication A, the QQ multiple user video communication B and the QQ multiple user video communication C. In case that the QQ multiple user video communication A and the QQ multiple user video communication B is both enabled for simultaneous audio/video communication, there would be interference between the QQ multiple user video communication A and the QQ multiple user video communication B.

For avoiding the interference, in the current embodiment, audio/video communications for other windows for audio/video communication are disabled according to the enabling instruction, which indicates that the audio/video communication for any one of the windows for audio/video communication is enabled, the audio/video communication for other windows for audio/video communication would be disabled, which also means that audio/video communication for only one windows for audio/video communication would be enabled at one time.

Figure 2:
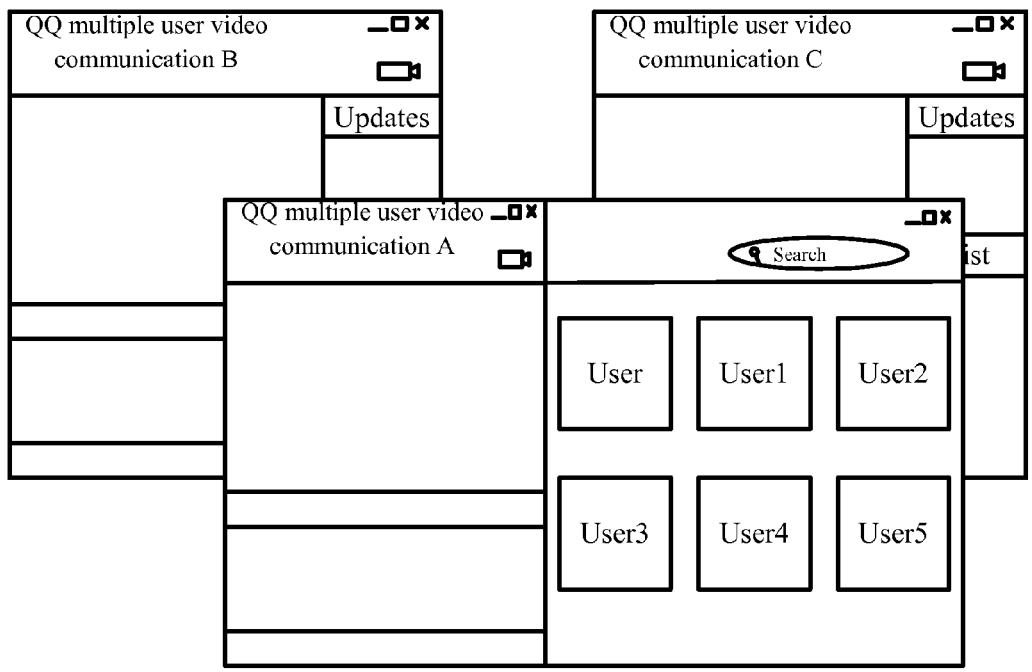
FIG. 2 is an illustrative diagram for opening a window for audio/video communication according to an exemplary embodiment.
Figure 3:
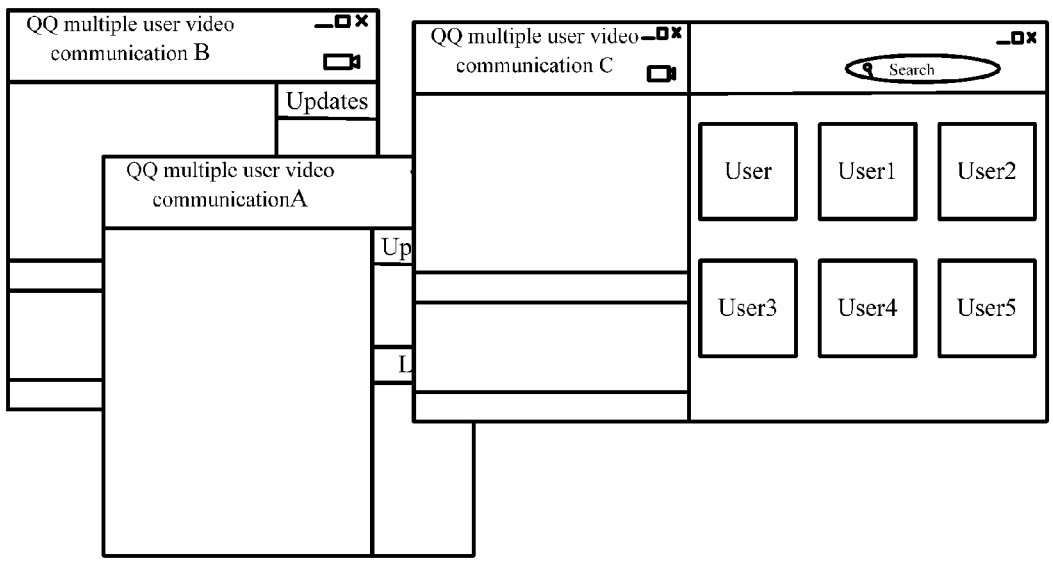
FIG. 3 is an illustrative diagram for opening another window for audio/video communication according to an exemplary embodiment.

For example, referring to FIG. 2 and FIG. 3, if the user initially enables audio/video communication for the QQ multiple user video communication A, it is obtained an enabling instruction for enabling the QQ multiple user video communication A and accordingly, disabling the QQ multiple user video communication B and the QQ multiple user video communication C. If the user later enables the QQ multiple user video communication B, it is then obtained the enabling instruction for enabling the QQ multiple user video communication B and accordingly automatically disabling the QQ multiple user video communication A. Thereby, it is avoided the interference while the user does not needed to operate. It is convenience and facilitate, which improves the convenience for the user operation.

According to an embodiment, the step of disabling audio/video communication for other windows for audio/video communication amongst the multiple windows for audio/video communication according to the enabling instruction includes in detail: the client suspending audio/video data for the other windows for audio/video communication according to the enabling instruction; or the client sending the enabling instruction to the server, the server suspending audio/video data for the other windows for audio/video communication according to the enabling instruction.

Besides, when the windows for audio/video communication are windows for multiple user audio/video communication, the windows may have multiple users. When the windows for audio/video communication enable the audio/video communication, each user would confront with all the users as the object for the audio/video communication, and have all identical video objects or audio object. However, a single user might optionally choose particular users to conduct audio/video communication while disenables those who are not needed to conduct the audio/video communication, thereby it is required to manage the audio/video communication between the users in the window.

According to one embodiment, the method for audio/video communication includes further: the client obtaining a user list corresponding to the window for audio/video communication which enabling the audio/video communication and displaying users in the user list in the window for audio/video communication.

In the present embodiment, it is stored in the server the user list of respective windows for audio/video communication. When the user opens a window for audio/video communication through the client, the server receives and sends audio/video data according to the user list. The client obtains the user list and displays the users. Besides, audio/video communication icons could be set at the displaying positions of each user. When clicking an audio/video communication icon corresponding to one user, it could be triggered the enabling instruction or disabling instruction between the user for the audio/video communication.

According to another embodiment, the method for audio/video communication includes further: obtaining a disabling instruction by a user to disable an audio/video communication, and disabling the audio/video communication according to the disabling instruction.

When the user disables unneeded audio/video communication with another user, the user clicks an audio/video communication icon at the displaying position of the object user, and generates a disabling instruction to obtain the object user that is determined to be disabled according to the disabling instruction; disabling the audio/video communication with the object user according to the disabling instructions and further managing the audio/video communication of the object user, thereby meeting the user's individualized demands.

According to an embodiment, the step of obtaining a disabling instruction by a user to disable an audio/video communication, and disabling the audio/video communication according to the audio/video communication includes in detail: the client obtaining a disabling instruction for a user to disable audio/video communication with an object user, blocking audio/video data of the object user according to the disabling instruction; or the client obtaining a disabling instruction for a user to disable audio/video communication with an object user and sending the disabling instruction to the server, the server suspending the sending of the object user's audio/video data to the client according to the disabling instruction.

Therefore, for each user, the audio/video data of the user would be normally uploaded to the server, while the client blocks the audio/video data or the server suspends the sending of the audio/video data of particular object user that is to be disabled to a user whereas it is only closed in the windows of this user, thereby other users would not be influenced. Therefore, each user would easily and conveniently manage the audio/video communication with all the users, and individualized demand for the user to choose particular video object user or audio object user could be met.

Figure 4:
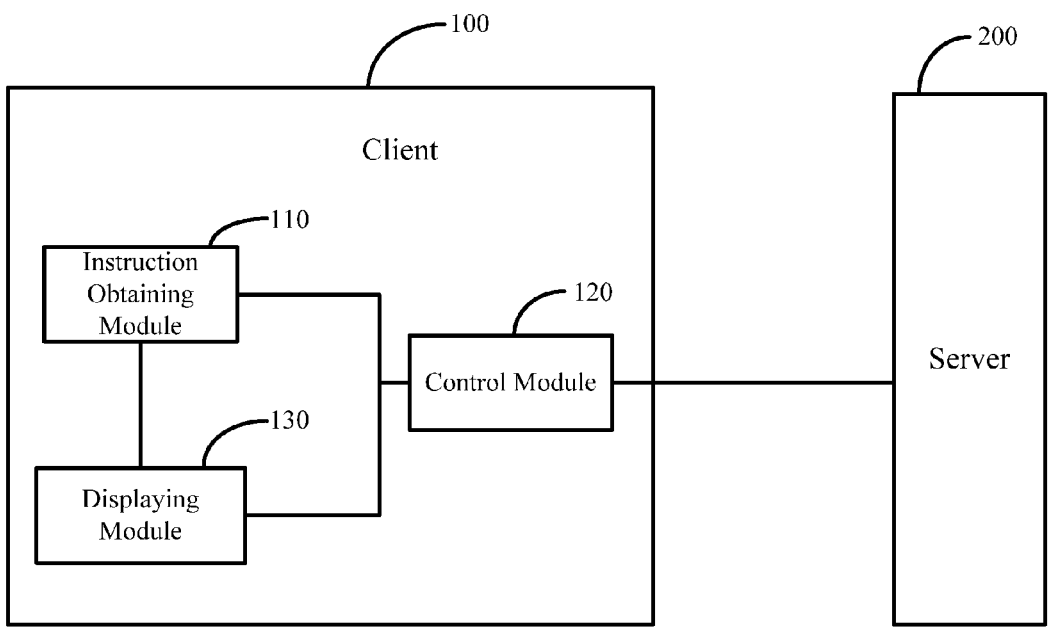
FIG. 4 is a block diagram of a system for audio/video communication according to an embodiment.

Referring to FIG. 4, a block diagram of a system for audio/video communication is illustrated. The system includes a client 100 and a server 200 which sets up audio/video communication connection with the client 100. The client 100 opens multiple windows for audio/video communication, the client 100 includes as follows.

An instruction obtaining module 110 for obtaining an enabling instruction for enabling audio/video communication of any one of the windows for audio/video communication amongst the multiple windows for audio/video communication.

The audio/video communication is performed through a user opening windows for audio/video communication at a client 100 and setting up connection for audio/video communication through a server 200, thereby exchanging audio/video data. When conducting the audio/video communication, the users at the client 100 may usually open multiple windows for the audio/video communication. The multiple windows for the audio/video communication could be windows for the audio/video communication with another single user, or windows for the audio/video communication with multiple users (audio/video communication groups or audio/video communication chatting rooms). For instance, referring to FIG. 2, a user uses a QQ client for the instant messaging; the user simultaneously opens three windows for multiple users audio/video communication group or multiple users audio/video communication chatting room, respectively for QQ multiple users video communication A, for QQ multiple users video communication B, and for QQ multiple user video communication C.

According to an embodiment, audio/video communication icons are set in each window for audio/video communication for enabling the audio/video communication of the windows for audio/video communication. When enabling the audio/video communication for the window for audio/video communication, the user clicks the audio/video communication icon in the windows for audio/video communication, thereby generating an enabling instruction. The instruction obtaining module 110 is used for obtaining the enabling instruction.

A control module 120 for disabling audio/video communication for other windows for audio/video communication amongst the multiple windows for audio/video communication according to the enabling instruction.

When the user opens multiple windows for audio/video communication, there would be more than one window that conducting audio/video communication simultaneously, thereby they could be interference. For instance, referring to FIG. 2, the user opens three multiple users audio/video communication group or audio/video communication chatting room including the QQ multiple user video communication A, the QQ multiple user video communication B and the QQ multiple user video communication C. In case that the QQ multiple user video communication A and the QQ multiple user video communication B is both enabled for simultaneous audio/video communication, there would be interference between the QQ multiple user video communication A and the QQ multiple user video communication B.

For avoiding the interference, in the current embodiment, the control module 120 disables the audio/video communication for other windows for audio/video communication according to the enabling instruction, which indicates that the audio/video communication for any one of the windows for audio/video communication is enabled, the control module 120 would disable the audio/video communication for other windows for audio/video communication, which also means that audio/video communication for only one windows for audio/video communication would be enabled at one time.

For example, referring to FIG. 2 and FIG. 3, if the user initially enables audio/video communication for the QQ multiple user video communication A, the control module 120 disables the QQ multiple user video communication B and the QQ multiple user video communication C according to an enabling instruction for enabling the QQ multiple user video communication A. If the user later enables the QQ multiple user video communication B, the control module 120 automatically disables the QQ multiple user video communication A according to the enabling instruction for enabling the QQ multiple user video communication B. Thereby, it is avoided the interference while the user does not needed to operate. It is convenience and facilitate, which improves the convenience for the user operation.

According to an embodiment, the control module 120 suspends audio/video data for the other windows for audio/video communication according to the enabling instruction; or the control module 120 sends the enabling instruction to the server, the server suspends audio/video data for the other windows for audio/video communication according to the enabling instruction.

Besides, when the windows for audio/video communication are windows for multiple user audio/video communication, the windows may have multiple users. When the windows for audio/video communication enable the audio/video communication, each user would confront with all the users as the object for the audio/video communication, and have all identical video objects or audio object. However, a single user might optionally choose particular users to conduct audio/video communication while disenables those who are not needed to conduct the audio/video communication, thereby it is required to manage the audio/video communication between the users in the window.

According to an embodiment, the system for audio/video communication includes further: a displaying module 130 connecting with the instruction obtaining module 110 and the control module 120 for obtaining a user list corresponding to the window for audio/video communication which enabling the audio/video communication, and displaying users in the user list in the window for audio/video communication.

In the present embodiment, it is stored in the server 200 the user list of respective windows for audio/video communication. When the user opens a window for audio/video communication through the client 100, the server 200 receives and sends audio/video data according to the user list. Besides, audio/video communication icons could be set at the displaying positions of each user. When clicking an audio/video communication icon corresponding to one user, it could be triggered the enabling instruction or disabling instruction between the user for the audio/video communication.

The displaying module 130 obtains the user list and displays each user, determines the multiple users in the window for audio/video communication and displays to the user. When the user disables unneeded audio/video communication with another user, the user clicks an audio/video communication icon at the displaying position of the object user, and triggers a disabling instruction.

The instruction obtaining module 110 is used further for obtaining a disabling instruction by a user to disable an audio/video communication. The control module 120 is further used for disabling the audio/video communication according to the disabling instruction.

When the user disables unneeded audio/video communication with another user, it is generated a disabling instruction to obtain the object user that is determined to be disabled according to the disabling instruction; disabling the audio/video communication with the object user according to the disabling instructions and further managing the audio/video communication of the object user, thereby meeting the user's individualized demands.

In the present embodiment, the instruction obtaining module 110 is further used for obtaining a disabling instruction for a user to disable audio/video communication with an object user; the control module 120 is further used for blocking audio/video data of the object user according to the disabling instruction; or the control module 120 is used for sending the disabling instruction to the server 200; while the server 200 suspends the sending of the object user's audio/video data to the client 100 according to the disabling instruction.

Therefore, for each user, the audio/video data of the user would be normally uploaded to the server 200, while the control module 120 blocks the audio/video data or the server 200 suspends the sending of the audio/video data of particular object user that is to be disabled to a user whereas it is only closed in the windows of this user, thereby other users would not be influenced. Therefore, each user would easily and conveniently manage the audio/video communication with all the users, and individualized demand for the user to choose particular video object user or audio object user could be met.

Those skilled in the art could understand that the whole or part of the flows included in the method of the above embodiments could be accomplished by relative hardware under instruction of computer programs. The programs could be stored in computer readable storage medium. When executing the program, it would be included the flows as in the methods of the above embodiments. Wherein, the storage medium could be magnetic disks, optical disks, read-only memories, or random access memories, etc.

The above method and system for audio/video communication obtain enabling instructions from the user for enabling any window for audio/video communication, and disable audio/video communication of the other windows for audio/video communication according to the enabling instruction, while the user would not have to close those unneeded windows for audio/video communication one by one, thereby improves the facility of operation greatly, saving time and loosen the user's burden, and meets the users' more and more demands.

The above described embodiments explain only several exemplary embodiments of the present disclosure which are rather detailed and could not be understood as for limiting the scope of claims of the present disclosure. It shall be mentioned that for those skilled in the art, alternative embodiments could be made to which the present disclosure pertains without departing from its spirit and scope, wherein the alternative embodiments shall be defined as within the claim of the current disclosure.

What is claimed is:

1. A method for audio/video communication comprising:
   a client setting up a connection with a server for audio/video communication, the client opening multiple windows for the audio/video communication;
   obtaining an enabling instruction for enabling audio/video communication of one of the windows for audio/video communication amongst the multiple windows for audio/video communication; and
   in response to enabling audio/video communication of the one of the windows, automatically disabling audio/video communication for other windows for audio/video communication amongst the multiple windows for audio/video communication.

2. The method for audio/video communication according to claim 1, wherein audio/video communication icons are set in each window for audio/video communication for enabling the audio/video communication of the windows for audio/video communication; when enabling the audio/video communication for the window for audio/video communication, clicking the audio/video communication icon in the windows for audio/video communication, thereby generating an enabling instruction.

3. The method for audio/video communication according to claim 1, wherein the step of disabling audio/video communication for other windows for audio/video communication amongst the multiple windows for audio/video communication according to the enabling instruction comprises in detail:
   the client suspending audio/video data for the other windows for audio/video communication according to the enabling instruction; or
   the client sending the enabling instruction to the server, the server suspending audio/video data for the other windows for audio/video communication according to the enabling instruction.

4. The method for audio/video communication according to claim 1, wherein the method further comprises: the client obtaining a user list corresponding to the window for audio/video communication which enabling the audio/video communication, and displaying users in the user list in the window for audio/video communication; the server storing the user list of respective windows for audio/video communication, the server receiving and sending audio/video data according to the user list.

5. The method for audio/video communication according to claim 4, wherein audio/video communication icons are set at the displaying positions of each user; triggering the enabling instruction or disabling instruction for the audio/video communication when clicking an audio/video communication icon corresponding to one user.

6. The method for audio/video communication according to claim 4, wherein the method further comprises: obtaining a disabling instruction by a user to disable an audio/video communication, and disabling the audio/video communication according to the disabling instruction.

7. The method for audio/video communication according to claim 6, wherein the step of obtaining a disabling instruction by a user to disable an audio/video communication, and disabling the audio/video communication according to the audio/video communication comprises in detail:
   the client obtaining a disabling instruction for a user to disable audio/video communication with an object user, blocking audio/video data of the object user according to the disabling instruction; or
   the client obtaining a disabling instruction for a user to disable audio/video communication with an object user and sending the disabling instruction to the server, the server suspending the sending of the object user's audio/video data to the client according to the disabling instruction.

8. A system for audio/video communication comprising a client and a server setting up audio/video communication connection with the client; the client opening multiple windows for audio/video communication, wherein the client comprises:
   an instruction obtaining module configured to obtain an enabling instruction for enabling audio/video communication of one of the windows for audio/video communication amongst the multiple windows for audio/video communication; and
   a control module configured to disable audio/video communication for other windows for audio/video communication amongst the multiple windows for audio/video communication in response to enabling audio/video communication of the one of the windows for audio/video communication.

9. The system for audio/video communication according to claim 8, wherein audio/video communication icons are set in each window for audio/video communication for enabling the audio/video communication of the windows for audio/video communication; when enabling the audio/video communication for the window for audio/video communication, clicking the audio/video communication icon in the windows for audio/video communication, thereby generating an enabling instruction.

10. The system for audio/video communication according to claim 8, wherein
    the control module is used for suspending audio/video data for the other windows for audio/video communication according to the enabling instruction; or
    the control module is used for sending the enabling instruction to the server, the server suspending audio/video data for the other windows for audio/video communication according to the enabling instruction.

11. The system for audio/video communication according to claim 8, wherein the client further comprises:
    a displaying module for obtaining a user list corresponding to the window for audio/video communication which enabling the audio/video communication, and displaying users in the user list in the window for audio/video communication;
    the server is further used for storing the user list of respective windows for audio/video communication, and for receiving and sending audio/video data according to the user list.

12. The system for audio/video communication according to claim 11, wherein audio/video communication icons are set at the displaying positions of each user;
    triggering the enabling instruction or disabling instruction for the audio/video communication when clicking an audio/video communication icon corresponding to one user.

13. The system for audio/video communication according to claim 11, wherein the instruction obtaining module is further used for obtaining a disabling instruction by a user to disable an audio/video communication; the control module is further used for disabling the audio/video communication according to the disabling instruction.

14. The system for audio/video communication according to claim 12, wherein the control module is further used for blocking audio/video data of the object user according to the disabling instruction; or
    the control module is used for sending the disabling instruction to the server; while the server suspends the sending of the object user's audio/video data to the client according to the disabling instruction.

15. A client for audio/video communication setting up audio/video communication connection with a server and opening multiple windows for audio/video communication, wherein the client comprises:
    an instruction obtaining module configured to obtain an enabling instruction for enabling audio/video communication of one of the windows for audio/video communication amongst the multiple windows for audio/video communication; and
    a control module configured to disable audio/video communication for other windows for audio/video communication amongst the multiple windows for audio/video communication in response to enabling audio/video communication of the one of the windows for audio/video communication.

16. The client for audio/video communication according to claim 15, wherein audio/video communication icons are set in each window for audio/video communication for enabling the audio/video communication of the windows for audio/video communication; when enabling the audio/video communication for the window for audio/video communication, clicking the audio/video communication icon in the windows for audio/video communication, thereby generating an enabling instruction.

17. The client for audio/video communication according to claim 15, wherein
    the control module is used for suspending audio/video data for the other windows for audio/video communication according to the enabling instruction; or
    the control module is used for sending the enabling instruction to the server, the server suspending audio/video data for the other windows for audio/video communication according to the enabling instruction.

18. The client for audio/video communication according to claim 15, wherein the client further comprises:
    a displaying module for obtaining a user list corresponding to the window for audio/video communication which enabling the audio/video communication, and displaying users in the user list in the window for audio/video communication;
    the server is further used for storing the user list of respective windows for audio/video communication, and for receiving and sending audio/video data according to the user list.

19. The client for audio/video communication according to claim 18, wherein audio/video communication icons are set at the displaying positions of each user; triggering the enabling instruction or disabling instruction for the audio/video communication when clicking an audio/video communication icon corresponding to one user.

20. The client for audio/video communication according to claim 18, wherein the instruction obtaining module is further used for obtaining a disabling instruction by a user to disable an audio/video communication; the control module is further used for disabling the audio/video communication according to the disabling instruction.

21. The client for audio/video communication according to claim 20, wherein the control module is further used for blocking audio/video data of the object user according to the disabling instruction; or
    the control module is used for sending the disabling instruction to the server; while the server suspends the sending of the object user's audio/video data to the client according to the disabling instruction.

\* \* \* \* \*